United States Patent
Bellamy

[19]

[11] Patent Number: 5,975,393
[45] Date of Patent: Nov. 2, 1999

[54] FISHING ROD CARRYING BACKPACK

[76] Inventor: John N. Bellamy, 10945 SW. 141 La., Miami, Fla. 33176

[21] Appl. No.: 09/133,444

[22] Filed: Aug. 13, 1998

[51] Int. Cl.[6] ............................... A45F 3/04; A01K 97/08
[52] U.S. Cl. ..................... 224/655; 224/651; 224/652; 224/629; 224/637; 224/237; 224/922; 43/26; 206/315.11; 383/41; 383/66; 383/84; D3/217; D3/221
[58] Field of Search ..................... 224/627, 628, 224/629, 630, 637, 645, 650–655, 659, 235, 236, 237, 246, 922, 153; 190/113, 114; 211/70.8; 206/315.11, 443; 43/26; D3/216, 217, 221; 383/41, 66, 84

[56] References Cited

U.S. PATENT DOCUMENTS

| | | | |
|---|---|---|---|
| D. 375,622 | 11/1996 | Croft | D3/217 |
| 747,681 | 12/1903 | Bradbury | 224/236 X |
| 2,295,143 | 9/1942 | Watkins | 224/237 X |
| 3,127,077 | 3/1964 | Faro | 224/629 |
| 5,090,526 | 2/1992 | Jacober | 224/629 X |
| 5,319,874 | 6/1994 | Vance | 206/315.11 X |
| 5,366,076 | 11/1994 | Lyles | 206/315.11 |
| 5,409,106 | 4/1995 | Smith | 206/315.11 |
| 5,573,166 | 11/1996 | Leja | 224/651 X |
| 5,676,295 | 10/1997 | Gelb | 224/628 X |

FOREIGN PATENT DOCUMENTS

| | | | |
|---|---|---|---|
| 1521624 | 4/1968 | France | 383/41 |
| 177380 | 3/1922 | United Kingdom | 224/209 |

*Primary Examiner*—Gregory M. Vidovich

[57] ABSTRACT

A fishing rod carrying backpack for holding fishing rods. The backpack includes a bottom portion having a bottom panel and a perimeter side wall. A front panel and a spaced apart pair of side panels are upwardly extended from the upper edge of the perimeter side wall. The bottom portion, the front panel and the side panels define an interior space for holding fishing rods therein. Upper and lower cover panels are coupled to one of the side panels and detachably attached to the other side panel to help hold fishing rods in the interior space.

9 Claims, 3 Drawing Sheets

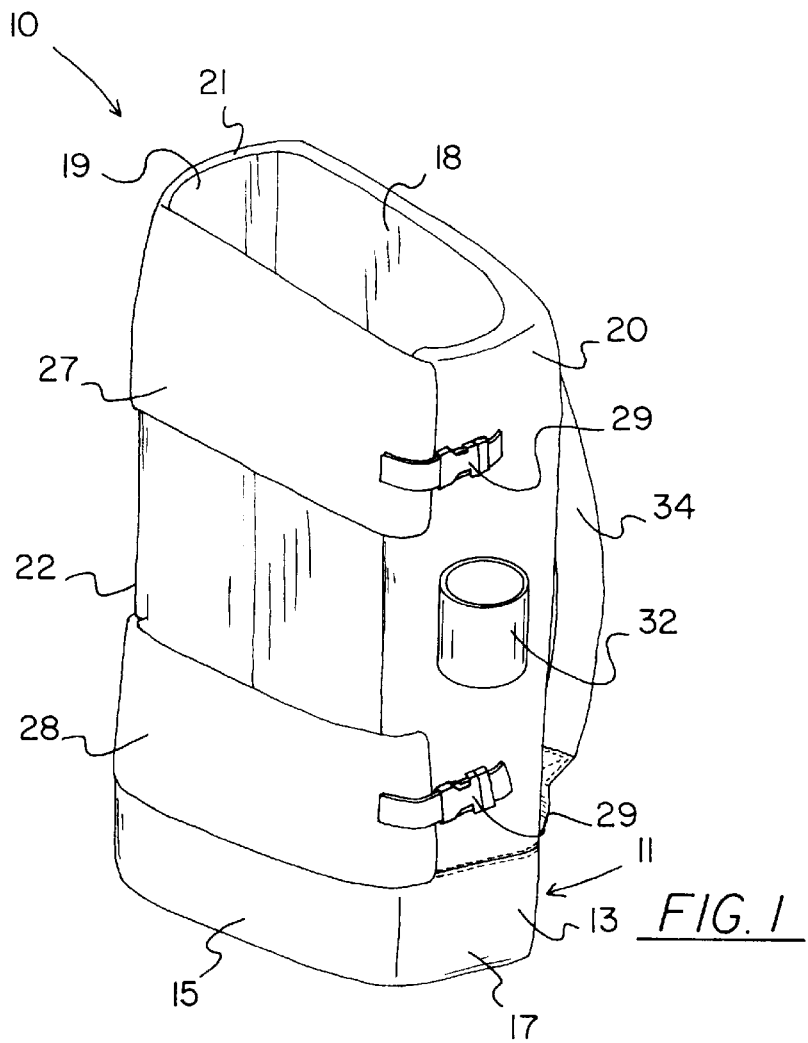
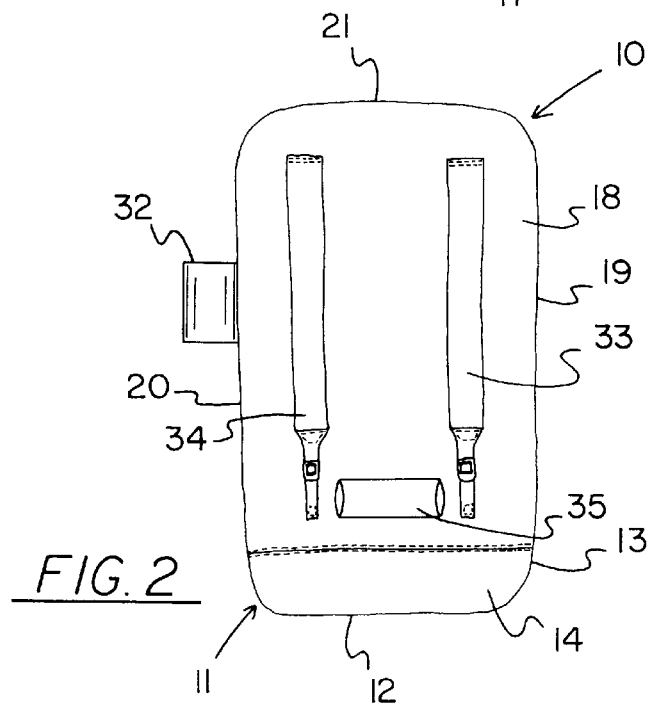

FISHING ROD CARRYING BACKPACK

BACKGROUND OF THE INVENTION

1. Field of the Invention

The present invention relates to backpacks and fishing rod carriers and more particularly pertains to a new fishing rod carrying backpack for holding fishing rods.

2. Description of the Prior Art

The use of backpacks and fishing rod carriers is known in the prior art. More specifically, backpacks and fishing rod carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,529,112; U.S. Pat. No. 4,372,073; U.S. Pat. No. 5,275,316; U.S. Pat. No. 4,940,173; U.S. Pat. No. 5,154,332; and U.S. Pat. No. 5,406,291.

While these devices fulfill their respective, particular objectives and requirements, the aforementioned patents do not disclose a new fishing rod carrying backpack. The inventive device includes a bottom portion having a bottom panel and a perimeter side wall. A front panel and a spaced apart pair of side panels are upwardly extended from the upper edge of the perimeter side wall. The bottom portion, the front panel and the side panels define an interior space for holding fishing rods therein. Upper and lower cover panels are coupled to one of the side panels and detachably attached to the other side panel 20 to help hold fishing rods in the interior space.

In these respects, the fishing rod carrying backpack according to the present invention substantially departs from the conventional concepts and designs of the prior art, and in so doing provides an apparatus primarily developed for the purpose of holding fishing rods.

SUMMARY OF THE INVENTION

In view of the foregoing disadvantages inherent in the known types of backpacks and fishing rod carriers now present in the prior art, the present invention provides a new fishing rod carrying backpack construction wherein the same can be utilized for holding fishing rods.

The general purpose of the present invention, which will be described subsequently in greater detail, is to provide a new fishing rod carrying backpack apparatus and method which has many of the advantages of the backpacks and fishing rod carriers mentioned heretofore and many novel features that result in a new fishing rod carrying backpack which is not anticipated, rendered obvious, suggested, or even implied by any of the prior art backpacks and fishing rod carriers, either alone or in any combination thereof.

To attain this, the present invention generally comprises a bottom portion having a bottom panel and a perimeter side wall. A front panel and a spaced apart pair of side panels are upwardly extended from the upper edge of the perimeter side wall. The bottom portion, the front panel and the side panels define an interior space for holding fishing rods therein. Upper and lower cover panels are coupled to one of the side panels and detachably attached to the other side panel 20 to help hold fishing rods in the interior space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing rod carrying backpack apparatus and method which has many of the advantages of the backpacks and fishing rod carriers mentioned heretofore and many novel features that result in a new fishing rod carrying backpack which is not anticipated, rendered obvious, suggested, or even implied by any of the prior art backpacks and fishing rod carriers, either alone or in any combination thereof.

It is another object of the present invention to provide a new fishing rod carrying backpack which may be easily and efficiently manufactured and marketed.

It is a further object of the present invention to provide a new fishing rod carrying backpack which is of a durable and reliable construction.

An even further object of the present invention is to provide a new fishing rod carrying backpack which is susceptible of a low cost of manufacture with regard to both materials and labor, and which accordingly is then susceptible of low prices of sale to the consuming public, thereby making such fishing rod carrying backpack economically available to the buying public.

Still yet another object of the present invention is to provide a new fishing rod carrying backpack which provides in the apparatuses and methods of the prior art some of the advantages thereof, while simultaneously overcoming some of the disadvantages normally associated therewith.

Still another object of the present invention is to provide a new fishing rod carrying backpack for holding fishing rods.

Yet another object of the present invention is to provide a new fishing rod carrying backpack which includes a bottom portion having a bottom panel and a perimeter side wall. A front panel and a spaced apart pair of side panels are upwardly extended from the upper edge of the perimeter side wall. The bottom portion, the front panel and the side panels define an interior space for holding fishing rods therein. Upper and lower cover panels are coupled to one of the side panels and detachably attached to the other side panel 20 to help hold fishing rods in the interior space.

Still yet another object of the present invention is to provide a new fishing rod carrying backpack that includes additional compartments for holding other fishing and tackle items therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic back perspective view of a new fishing rod carrying backpack according to the present invention.

FIG. 2 is a schematic front side view of the present invention.

DESCRIPTION OF THE PREFERRED EMBODIMENT

Figure 3:
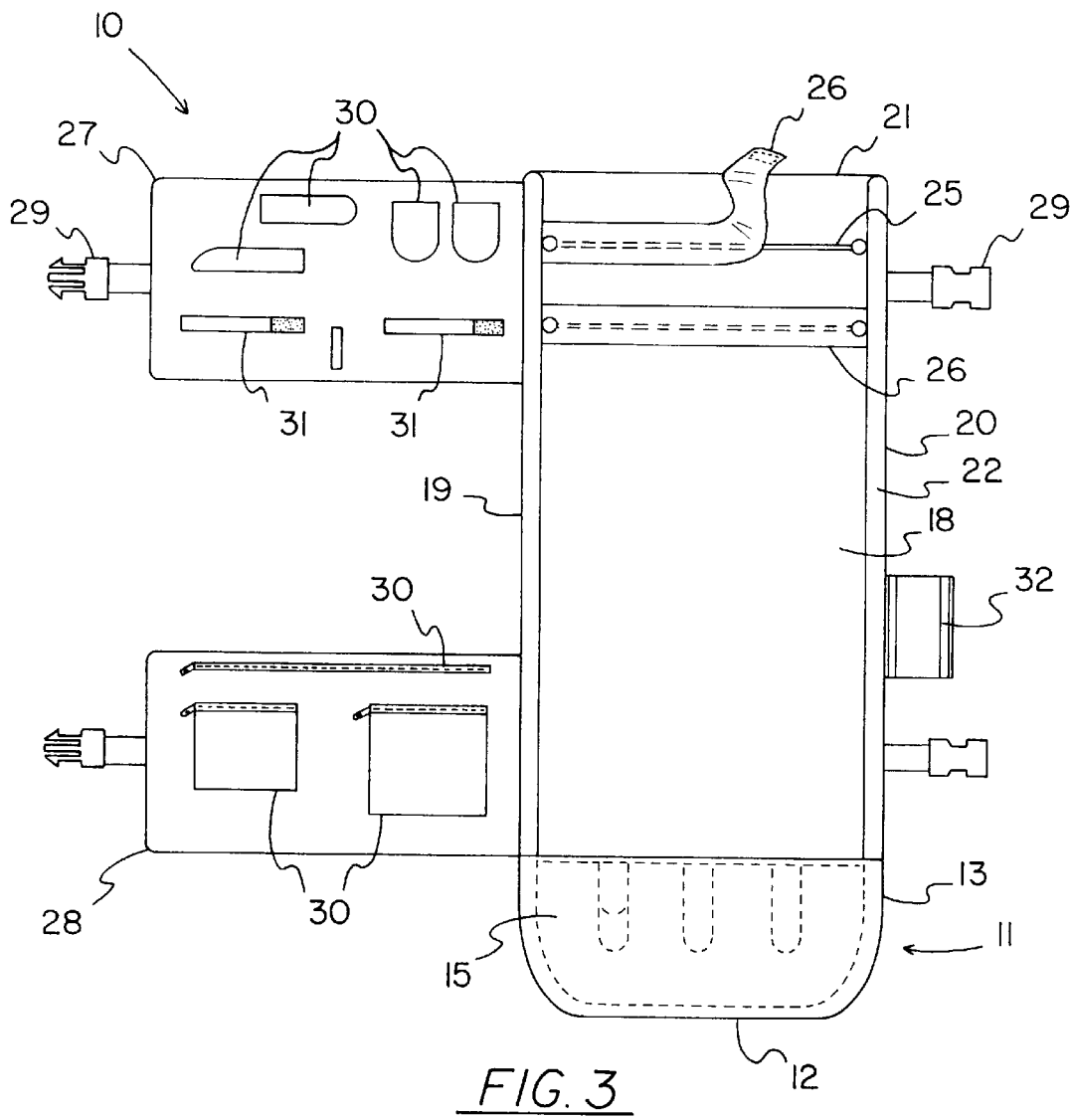
FIG. 3 is a schematic back side view of the present invention.
Figure 4:
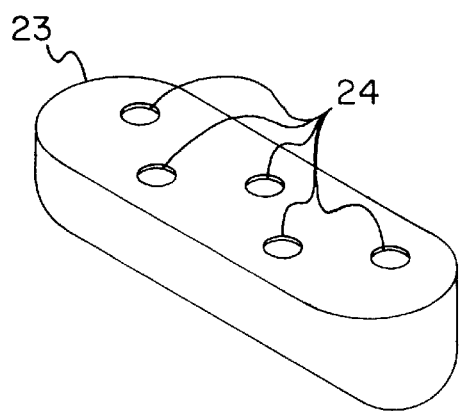
FIG. 4 is a schematic perspective view of the rod holding member of the present invention.
Figure 5:
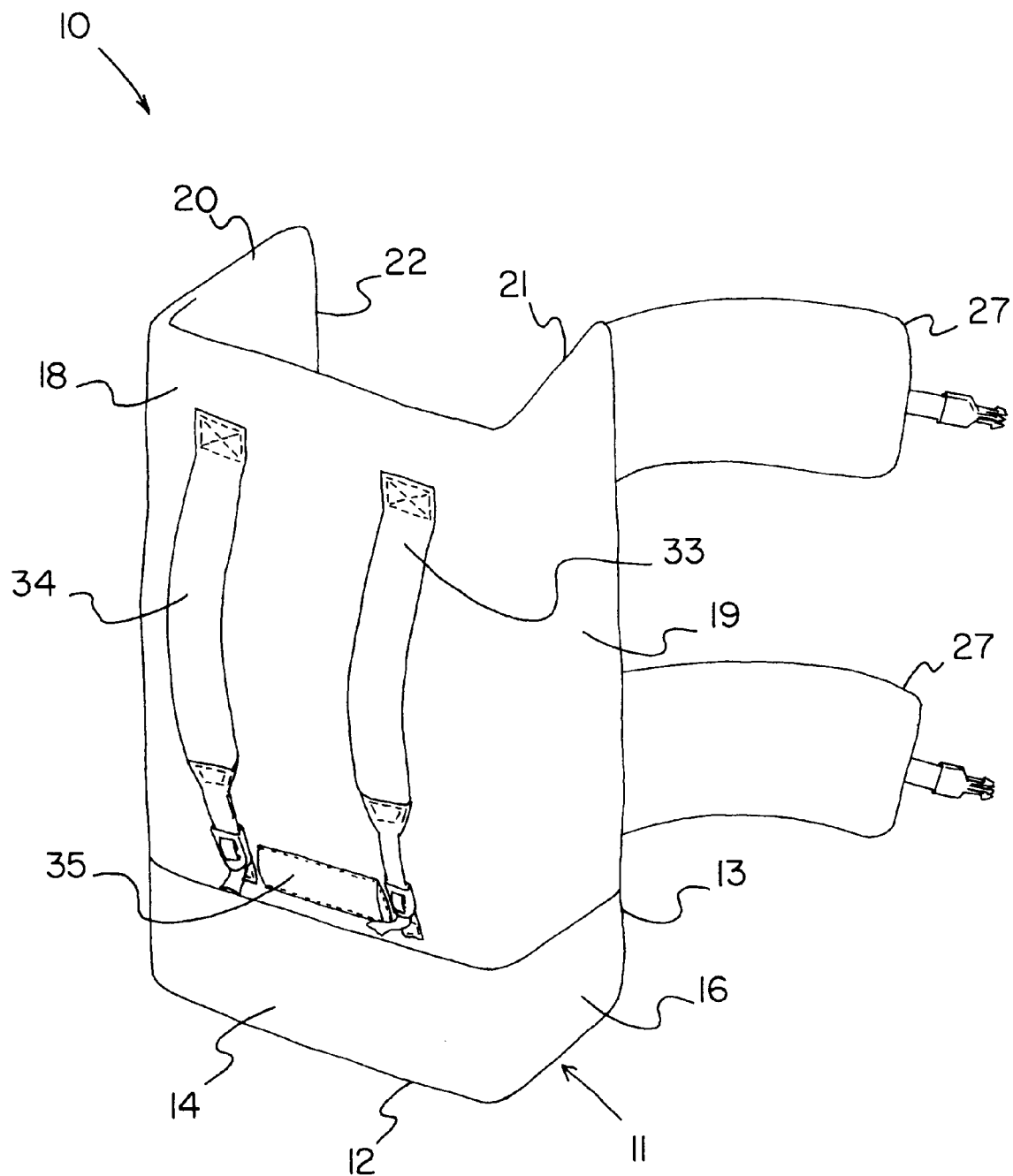
FIG. 5 is a schematic front perspective view of the present invention.

With reference now to the drawings, and in particular to FIGS. 1 through 5 thereof, a new fishing rod carrying backpack embodying the principles and concepts of the present invention and generally designated by the reference numeral 10 will be described.

As best illustrated in FIGS. 1 through 5, the fishing rod carrying backpack 10 generally comprises a bottom portion 11 having a bottom panel 12 and a perimeter side wall 13. A front panel 18 and a spaced apart pair of side panels 19,20 are upwardly extended from the upper edge of the perimeter side wall 13. The bottom portion 11, the front panel 18 and the side panels 19,20 define an interior space for holding fishing rods therein. Upper and lower cover panels 27,28 are coupled to one of the side panels 19 and detachably attached to the other side panel 20 to help hold fishing rods in the interior space.

In closer detail, the bottom portion 11 has a generally rectangular bottom panel 12 and a perimeter side wall 13 upwardly extending around the perimeter of the bottom panel 12. Together, the bottom panel 12 and the perimeter side wall 13 define a bottom space. The perimeter side wall 13 of the bottom portion 11 has an upper edge, and front, back and a pair of side portions 14,15,16,17.

A front panel 18 and a spaced apart pair of side panels 19,20 are upwardly extended from the upper edge of the perimeter side wall 13. The front panel 18 is positioned adjacent the front portion 14 of the perimeter side wall 13. One of the side panels 19 is positioned adjacent one of the side portions 16 of the perimeter side wall 13 and the other side panel 20 is positioned adjacent the other side portion 17 of the perimeter side wall 13.

The front panel 18 is generally rectangular and has top and bottom edges and a pair of side edges extending between the top and bottom edges of the front panel 18. Similarly, each of the side panels 19,20 is generally rectangular and has top and bottom edges and front and back side edges extending between the top and bottom edges of the respective side panel. The front side edges of the side panels 19,20 are coupled to the front panel 18 with the front side edge of one of the side panels 19 coupled to one of the side edges of the front panel 18 and the front side edge of the other side panel 20 coupled to the other side edge of the front panel 18. Ideally, the front side edges of the side panels 19,20 are stitched to the front panel 18. The bottom edges of the front panel 18 and the side panels 19,20 are coupled to the upper edge of the perimeter side wall 13 along their respective portion 14,16,17 of the perimeter side wall 13. Ideally, the bottom edges of the front panel 18 and the side panels 19,20 are stitched to the upper edge of the perimeter side wall 13. The bottom portion 11, the front panel 18 and the side panels 19,20 each have an exterior and an interior with the interiors defining an interior space of the backpack. The back edges 22 of the side panels 19,20 and the top edges 21 of the front panel 18 and the side panels 19,20 define an opening into the interior space of the backpack.

A rod holding member 23 is preferably provided in the bottom space of the bottom portion 11. The rod holding member 23 has a top face which faces upwards in the bottom space of the bottom portion 11. The top face of the rod holding member 23 has a plurality of spaced apart generally cylindrical bores 24 therein. Each of the bores 24 is designed for receiving an end of a fishing rod therein (preferably the bottom handle end of the fishing rod) such that the rod extends upwards through the interior space and through a portion of the opening into the interior space defined by the top edges 21 of the front and side panels 19,20. Ideally, the plurality of bores 24 comprises five bores 24 arranged in a pair of staggered rows that extend between the side portions 16,17 of the perimeter side wall 13 when the rod holding member 23 is in the bottom portion 11.

A pair of spaced apart elongate hook rods 25 are extended in the interior space between side panels 19,20. Each of the hook rods 25 is designed for hooking thereon hooks on fishing rods in the interior space. The longitudinal axes of the hook rods 25 are preferably extended generally parallel to each other and generally horizontally. The hook rods 25 are positioned towards top edges 21 of the front panel 18 and the side panels 19,20. Each of the hook rods 25 has an elongate flexible holding strap 26 extending thereacross between the side panels 19,20. The holding straps 26 are designed for helping hold hooks hooked on to the associated hook rod to the associated hook rod. Each of the holding straps 26 has a pair of opposite ends with one of the ends of each of the holding straps 26 coupled to one of the side panels 19 and the other end of each holding strap 26 detachably attached to the other side panel 20. Ideally, a hook and loop fastener (such as the type sold under the trade name Velcro) detachably attaches the other of the ends of the holding straps 26 to the other side panel 20. The detachable ends of the holding straps 26 are designed for allowing easily removal of the hooks on the hook rods 25 when the end of the strap is detached from the side panel.

Spaced apart upper and lower cover panels 27,28 are also included. Each of the cover panels is generally rectangular and has a pair of end edges and a pair of side edges extending between the end edges of the respective cover panel. Each of the cover panels has a length defined between the end edges of the respective cover panel. One of the end edges of each of the cover panels is pivotally coupled to the back edge 22 of one of the side panels 19. Ideally, these end edges are stitched to the back edge 22 of the one of the side panels 19. The other end edge of each of the cover panels is detachably attached to the back edge 22 of the other side panel 20. Preferably, a fastener is provided for attaching each of the another end edges to the another side panel. Ideally, the fastener comprises a quick release type of buckle 29. The upper cover panel 27 is positioned towards the top edges 21 of the side panels 19,20 and the lower cover panel 28 is positioned towards the bottom edges of the side panels 19,20. Each of the cover panels has interior and exterior surfaces. The interior surfaces of each of the cover panels has a plurality of compartments 30 including pouches and pockets for holding items such as fishing tackle therein. The interior surface of the upper cover panel 27 also preferably has a pair of Velcro type straps 31 provided thereon for holding items to the upper cover panel 27. Ideally, a plurality of Velcro straps 31 are provided in one of the compartments of the lower cover panel 28 for use in securing the disassembled parts of a fishing rod together.

Ideally, the exterior of one of the side panels 20 has an insulated beverage container holder 32 coupled thereto adapted for receiving a beverage container such as a beverage can therein. Ideally, the front panel 18 and the bottom portion 11 are reinforced with a generally rigid plastic to provide extra structural support to these elements.

The exterior of the front panel 18 has a pair of spaced apart shoulder straps 33,34 adapted for permitting a user to carry the backpack on their backs. Each of the shoulder straps 33,34 has upper and lower ends coupled to the front panel 18. The exterior of the front panel 18 also preferably has a belt loop 35 adapted for extending a support belt therethrough. The belt loop 35 is positioned between the shoulder straps 33,34 adjacent the lower ends of the shoulder straps 33,34.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A backpack, comprising:
 a bottom portion having a bottom panel and a perimeter side wall upwardly extending around said bottom panel, said bottom panel and said perimeter side wall defining a bottom space;
 said perimeter side wall of said bottom portion having an upper edge;
 a front panel and a spaced apart pair of side panels being upwardly extended from said upper edge of said perimeter side wall;
 said bottom portion, said front panel and said side panels each having an exterior and an interior, said interiors defining an interior space; and
 upper and lower cover panels, said cover panels being coupled to one of said side panels, each of said cover panels being detachably attached to the other of said side panels, said front and side panels each having an upper edge and said side panels each having an upwardly extending back side edge free from said front panel, wherein an upper opening is defined by said upper edges of the said front and side panels and a side opening in communication with said top opening is defined by said back side edges of said side panels and an upper edge of said perimeter side wall adjacent side edges, said cover panels extending across said side opening.

2. The backpack of claim 1, wherein said perimeter side wall of said bottom portion having front, back and a pair of side portions, wherein said front panel is positioned adjacent said front portion of said perimeter side wall, wherein one of said side panels is positioned adjacent one of said side portions of said perimeter side wall and wherein the other of said side panels is positioned adjacent the other of said side portions of said perimeter side wall.

3. The backpack of claim 2, wherein said front panel is generally rectangular and further includes a bottom edge and a pair of side edges extending between said top and bottom edges of said front panel, wherein each of said side panels is generally rectangular and further includes a bottom edge and a front side edge wherein said back and front side edges extend between said top and bottom edges of the respective side panel, said front side edge of one of said side panels being coupled to one of said side edges of said front panel, said front side edge of the other of said side panels being coupled to the other of said side edges of said front panel.

4. The backpack of claim 3, wherein said bottom edges of said front panel and said side panels are coupled to said upper edge of said perimeter side wall.

5. The backpack of claim 1, further comprising a rod holding member being provided in said bottom space of said bottom portion, said rod holding member having a top face, said top face of said rod holding member having a plurality of spaced apart generally cylindrical bores therein, each of said bores being adapted for receiving an end of a fishing rod therein.

6. The backpack of claim 1, further comprising a pair of spaced apart elongate hook rods extending between said side panels.

7. The backpack of claim 6, wherein each of said hook rods has an elongate flexible holding strap extending thereacross between said side panels.

8. The backpack of claim 1, wherein each of said cover panels has interior and exterior surfaces, said interior surfaces of each of said cover panels having a plurality of compartments for holding items therein.

9. A backpack, comprising:
 a bottom portion having a generally rectangular bottom panel and a perimeter side wall upwardly extending around said bottom panel, said bottom panel and said perimeter side wall defining a bottom space;

said perimeter side wall of said bottom portion having an upper edge, and front, back and a pair of side portions;

a front panel and a spaced apart pair of side panels being upwardly extended from said upper edge of said perimeter side wall;

said front panel being positioned adjacent said front portion of said perimeter side wall, one of said side panels being positioned adjacent one of said side portions of said perimeter side wall and the other of said side panels being positioned adjacent the other of said side portions of said perimeter side wall;

said front panel being generally rectangular and having top and bottom edges and a pair of side edges extending between said top and bottom edges of said front panel;

each of said side panels being generally rectangular and having top and bottom edges and front and back side edges extending between said top and bottom edges of the respective side panel;

said front side edge of one of said side panels being coupled to one of said side edges of said front panel, said front side edge of the other of said side panels being coupled to the other of said side edges of said front panel;

said bottom edges of said front panel and said side panels being coupled to said upper edge of said perimeter side wall;

said bottom portion, said front panel and said side panels each having an exterior and an interior, said interiors defining an interior space;

said back edges of said side panel and said top edges of said front panel and said side panels defining an opening into said interior space;

a rod holding member being provided in said bottom space of said bottom portion, said rod holding member having a top face, said top face of said rod holding member having a plurality of spaced apart generally cylindrical bores therein, each of said bores being adapted for receiving an end of a fishing rod therein such that the rod extends upwards through the interior space and through a portion of said opening defined by said top edges of said front and side panels;

a pair of spaced apart elongate hook rods being extended in said interior space between said side panels, each of said hook rods being adapted for hooking thereon hooks on fishing rods in said interior space;

each of said hook rods having a longitudinal axis, said longitudinal axes of said hook rods being extended generally parallel to each other and generally horizontally;

said hook rods being positioned towards said top edges of said front panel and said side panels;

each of said hook rods having an elongate flexible holding strap extending thereacross between said side panels, said holding straps being adapted for helping hold hooks hooked on to the associated hook rod to the associated hook rod;

each of said holding straps having a pair of opposite ends, one of said ends of each of said holding straps being coupled to one of said side panels;

another of said ends of each of said holding straps being detachably attached to the other of said side panels, wherein a hook and loop fastener detachably attaches said other of said ends of said holding straps to said other of said side panels;

upper and lower cover panels each being generally rectangular and having a pair of end edges and a pair of side edges extending between said end edges of the respective cover panel, each of said cover panels having a length defined between said end edges of the respective cover panel;

one of said end edges of each of said cover panels being coupled to said back edge of one of said side panels;

the other of said end edges of each of said cover panels being detachably attached to said back edge of the other of said side panels, wherein a fastener is provided for attaching each of said other end edges to said other side panel;

said upper cover panel being positioned towards said top edges of said side panels, said lower cover panel being positioned towards said bottom edges of said side panels;

each of said cover panels having interior and exterior surfaces, said interior surfaces of each of said cover panels having a plurality of compartments;

said exterior of one of said side panels having a container holder coupled thereto adapted for receiving a beverage container therein;

said exterior of said front panel having a pair of spaced apart shoulder straps, each of said shoulder straps having upper and lower ends coupled to said front panel; and said exterior of said front panel having a belt loop adapted for extending a support belt therethrough, said belt loop being positioned between said shoulder straps adjacent said lower ends of said shoulder straps.

* * * * *